(12) United States Patent
Luss et al.

(10) Patent No.: US 12,555,004 B2
(45) Date of Patent: Feb. 17, 2026

(54) PATH-SUFFICIENT EXPLANATIONS FOR MODEL UNDERSTANDING

(71) Applicant: International Business Machines Corporation, Armonk, NY (US)

(72) Inventors: Ronny Luss, New York, NY (US); Amit Dhurandhar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1257 days.

(21) Appl. No.: 17/122,738

(22) Filed: Dec. 15, 2020

(65) Prior Publication Data

US 2022/0188666 A1 Jun. 16, 2022

(51) Int. Cl.
*G06N 5/04* (2023.01)
*G06F 17/13* (2006.01)

(52) U.S. Cl.
CPC ............ *G06N 5/04* (2013.01); *G06F 17/13* (2013.01)

(58) Field of Classification Search
CPC .......... G06N 5/04; G06N 5/045; G06N 20/00; G06F 17/11; G06F 17/13; G06F 17/18
See application file for complete search history.

(56) References Cited

U.S. PATENT DOCUMENTS

| | | | |
|---|---|---|---|
| 2014/0294239 A1* | 10/2014 | Duckett | G06T 7/0008 382/103 |
| 2020/0074331 A1 | 3/2020 | Arendt | |
| 2020/0104733 A1 | 4/2020 | Bart | |
| 2020/0167641 A1 | 5/2020 | Dhurandhar | |
| 2020/0193243 A1 | 6/2020 | Dhurandhar | |
| 2020/0387782 A1* | 12/2020 | Hegde | G06N 3/082 |

FOREIGN PATENT DOCUMENTS

| | | |
|---|---|---|
| CN | 109800889 A | 5/2019 |
| KR | 101893029 B1 | 10/2018 |
| KR | 20190036254 A | 4/2019 |
| WO | 2018187608 A1 | 10/2018 |

OTHER PUBLICATIONS

Carter et al. "What made you do this? Understanding black-box decisions with sufficient input subsets" Feb. 8, 2019, arxiv.org, arXiv: 1810.03805 (Year: 2019).*

Kearsley, A.J., Tapia, R.A., Trosset, M.W. (1996). An Approach to Parallelizing Isotonic Regression. In: Fischer, H., RiedmÃ1/4ller, B., SchÃ☐ffler, S. (eds) Applied Mathematics and Parallel Computing. Physica-Verlag HD. https://doi.org/10.1007/978-3-642-99789-1_10 (Year: 1996).*

(Continued)

*Primary Examiner* — James D. Rutten
(74) *Attorney, Agent, or Firm* — Eric W. Chesley (57) ABSTRACT

An approach to generate a path for minimally sufficient explanations for improving model understanding. Data is received from a user. The data is iteratively processed to generate minimally sufficient explanations based on the input data and the input of a subsequent explanation determination is constrained to the output of a prior explanation determination.

17 Claims, 5 Drawing Sheets

(56) References Cited

OTHER PUBLICATIONS

Hui Zou, Trevor Hastie, Regularization and Variable Selection Via the Elastic Net, Journal of the Royal Statistical Society Series B: Statistical Methodology, vol. 67, Issue 2, Apr. 2005, pp. 301-320, https://doi.org/10.1111/j.1467-9868.2005.00503.x (Year: 2005).*

Dhurandhar et al., "Towards Better Model Understanding with Path-Sufficient Explanations", Association for the Advancement of Artificial Intelligence Conference (AAAI 2021), submitted on Sep. 9, 2020, 10 pages, Grace Period Disclosure Document.

Mell et al., "The NIST Definition of Cloud Computing", Recommendations of the National Institute of Standards and Technology, Special Publication 800-145, Sep. 2011, 7 pages.

"Explainable Machine Learning Challenge", FICO Community, downloaded from the internet on Jan. 5, 2021, 4 pages, <https://community.fico.com/s/explainable-machine-learning-challenge?tabset-3158a=2>.

"Marcotcr / lime", GitHub, downloaded from the internet on Jan. 5, 2021, 6 pages, <https://github.com/marcoter/lime>.

"Trusted-AI / AIX360", GitHub, downloaded from the internet on Jan. 5, 2021, 6 pages, <https://github.com/Trusted-AI/AIX360>.

Beck et al., "A Fast Iterative Shrinkage-Thresholding Algorithm for Linear Inverse Problems", Siam J. Imaging Sciences, vol. 2, No. 1, DOI: 10.1137/080716542, pp. 183-202.

Bhatt et al., "Explainable Machine Learning in Deployment", Conference on Fairness, Accountability, and Transparency (FAT '20), Jan. 27-30, 2020, Barcelona, Spain, 10 pages, <https://doi.org/10.1145/3351095.3375624>.

Caruana et al., "Intelligible Models for HealthCare: Predicting Pneumonia Risk and Hospital 30-day Readmission", KDD'15, Aug. 10-13, 2015, Sydney, NSW, Australia, DOI: http://dx.doi.org/10.1145/2783258.2788613, pp. 1721-1730.

Chen et al., "InfoGAN: Interpretable Representation Learning by Information Maximizing Generative Adversarial Nets", arXiv:1606.03657v1 [cs.LG], Jun. 12, 2016, 14 pages.

Dhurandhar et al., "Explanations based on the Missing: Towards Contrastive Explanations with Pertinent Negatives", 32nd Conference on Neural Information Processing Systems (NeurIPS 2018), Montreal, Canada, 12 bages.

Dhurandhar et al., "Improving Simple Models with Confidence Profiles", 32nd Conference on Neural Information Processing Systems (NeurIPS 2018), Montreal, Canada, 11 pages.

Feng et al., "Pathologies of Neural Models Make Interpretations Difficult", arXiv:1804.07781v3 [cs.CL], Aug. 28, 2018, 14 pages.

Gunning, David, "Explainable Artificial Intelligence Research at DARPA", DARPA/120, provided by the inventors on Jan. 5, 2021, 24 pages.

Gurumoorthy et al., "Efficient Data Representation by Selecting Prototypes with Importance Weights", arXiv:1707.01212v4 [stat.ML], Aug. 12, 2019, 10 pages.

Hancox-Li, Leif, "Robustness in Machine Learning Explanations: Does It Matter?", Conference on Fairness, Accountability, and Transparency (FAT '20), Jan. 27-30, 2020, Barcelona, Spain, 8 pages, <https://doi.org/10.1145/3351095.3372836>.

He et al., "Deep Residual Learning for Image Recognition", arXiv:1512.03385v1 [cs.CV], Dec. 10, 2015, 12 pages.

Hinton et al., "Distilling the Knowledge in a Neural Network", arXiv:1503.02531v1 [stat.ML], Mar. 9, 2015, 9 pages.

Krause et al., "Interacting with Predictions: Visual Inspection of Black-box Machine Learning Models", CHI'16, May 7-12, 2016, San Jose, CA, USA, 12 pages, DOI: http://dx.doi.org/10.1145/2858036.2858529.

Kumar et al., "Variational Inference of Disentangled Latent Concepts from Unlabeled Observations", ICLR 2018, 16 pages.

Lapuschkin et al., "The LRP Toolbox for Artificial Neural Networks", Journal of Machine Learning Research 17 (2016), Published Jun. 2016, 5 pages.

Liu et al., "Deep Learning Face Attributes in the Wild", Computer Vision Foundation, provided by the inventors on Jan. 5, 2021, pp. 3730-3738.

Lundberg et al., "A Unified Approach to Interpreting Model Predictions", 31st Conference on Neural Information Processing Systems (NIPS 2017), Long Beach, CA, USA, 10 pages.

Luss et al., "Generating Contrastive Explanations with Monotonic Attribute Functions", arXiv:1905.12698v2 [cs.LG], Feb. 18, 2020, 26 pages.

Ribeiro et al., "'Why Should I Trust You?' Explaining the Predictions of Any Classifier", KDD 2016, San Francisco, CA, USA, DOI: http://dx.doi.org/10.1145/2939672.2939778, 10 pages.

Roth et al., "Updating our approach to misleading information", Twitter Blog, May 11, 2020, 3 pages, <https://blog.twitter.com/en_us/topics/product/2020/updating-our-approach-to-misleading-information.html>.

Simonyan et al., "Deep Inside Convolutional Networks: Visualising Image Classification Models and Saliency Maps", arXiv:1312.6034v2 [cs.CV], Apr. 19, 2014, 8 pages.

Wang et al., "Falling Rule Lists", Proceedings of the 18th International Conference on Artificial Intelligence and Statistics (AISTATS), 2015, San Diego, CA, USA, 10 pages.

Yannella et al., "Analysis: Article 29 Working Party Guidelines on Automated Decision Making Under GDPR", Cyber Adviser Blog, Jan. 16, 2018, 4 pages, <https://www.cyberadviserblog.com/2018/01/analysis-article-29-working-party-guidelines-on-automated-decision-making-under-gdpr/>.

* cited by examiner

PATH-SUFFICIENT EXPLANATIONS FOR MODEL UNDERSTANDING

STATEMENT REGARDING PRIOR DISCLOSURES BY THE INVENTOR OR A JOINT INVENTOR

The following disclosure(s) are submitted under 35 U.S.C. 102(b)(1)(A) as prior disclosures by, or on behalf of, a sole inventor of the present application or a joint inventor of the present application:

1) Submitted "Towards Better Model Understanding with Path-Sufficient Explanations" for consideration to the 2021 Association for the Advancement of Artificial Intelligence conference (AAAI 2021) on Sep. 9, 2020.

TECHNICAL FIELD

The present disclosure relates generally to the field of model classifiers, and more particularly to understanding and explaining local decisions of classifiers based on discovering a path of minimally sufficient explanations.

BACKGROUND

Utilization and impact of black-box models (e.g., neural networks) has significantly grown over the last decade creating the need for new tools to help users understand and trust models. Given this acute need, a number of methods have been proposed to explain local decisions of classifiers. Most of these methods highlight positively and negatively relevant features that determine the decision of the model for an input. More recently, there have been methods that highlight a minimal set of features (and values) that are sufficient to replicate the models decision. While these have been shown to have benefits over some of the aforementioned works, in many cases the highlighted features are too few to gauge the quality of the model. Accordingly, classification models must predict something for all possible values. For example, for an image recognition task, a blank picture will be predicted among one of the classes, implying that sparse explanations do not necessarily mean one should not trust the model, but rather look for more information.

BRIEF SUMMARY

According to an embodiment of the present invention, a computer-implemented method for generating minimally sufficient explanations for a differentiable model, the computer-implemented method comprising: receiving, by one or more processors, data and a model; generating, by the one or more processors, a plurality of sufficient explanations based on input of the data to the model wherein successive input is of decreasing size based on being constrained by a Path-Sufficient Explanations (PSE) algorithm until a minimally sufficient explanation predetermined threshold is exceeded.

According to an embodiment of the present invention, a computer program product for generating minimally sufficient explanations for a differentiable model, the computer program product comprising: one or more non-transitory computer readable storage media and program instructions stored on the one or more non-transitory computer readable storage media, the program instructions comprising: program instructions to receive data and a model; program instructions to generate a plurality of sufficient explanations based on input of the data to the model wherein successive input is of decreasing size based on being constrained by a Path-Sufficient Explanations (PSE) algorithm until a minimally sufficient explanation predetermined threshold is exceeded.

According to an embodiment of the present invention, a computer system for generating minimally sufficient explanations for a differentiable model, the computer system comprising: one or more computer processors; one or more computer readable storage media; and program instructions stored on the one or more computer readable storage media for execution by at least one of the one or more processors, the program instructions comprising: program instructions to receive data and a model; program instructions to generate a plurality of sufficient explanations based on input of the data to the model wherein successive input is of decreasing size based on being constrained by a Path-Sufficient Explanations (PSE) algorithm until a minimally sufficient explanation predetermined threshold is exceeded.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of generating a path of minimally sufficient explanations for model understanding. It should be noted that the term software, as used herein, includes any type of computer instructions such as, but not limited to, firmware, microcode, etc.

Embodiments of the present invention can be applied to images, text, and tabular data. Considering image data, the embodiments can provide better insight and converges to more intuitive explanations, highlighting a greater number of sparse regions and making a complete explanation rather than a contiguous region that is approximately of the same sparsity level. Furthermore, the generated path exemplifies how the model behaves locally in the vicinity of the boundary of the predicted example.

Considering tabular data, the embodiments can provide more realistic solutions for implementation. For example, the embodiments can be applied to home equity line of credit (HELOC) data, and results of use of the embodiments show how credit applicants can increase a little risk while maintaining their good standing, versus the Current Exposure Method (CEM) which might find a solution that says if the applicant closed all their current credit accounts, an unrealistic suggestion, they would maintain their good standing.

Considering text data, the embodiments can be much more consistent in generating sparse explanations with additional intuition determined from the path.

Embodiments of the present invention can take a model and instance to be predicted as input. The embodiments can explain why the model makes its particular prediction on that instance. The embodiments can solve a sequence of optimization problems, each taking an instance as input, and finding a minimally sufficient explanation for that input. The first optimization problem can be executed on the original instance, which can output a first explanation, which can be a new instance that can be a subset of the original instance. The first explanation can be used as an input to a subsequent optimization problem to provide a minimally sufficient explanation for why the first explanation was predicted to be in the same target class. An iterative execution can continue until an explanation is of a sufficient sparsity level for the user, i.e., exceeds a predetermined sparsity level. Embodiments can use regularization to approximate a solution to a constrained optimization equation to assure a subsequent explanation remains close to the previous explanation, as a smooth path of explanations of minimum sufficiency is generated.

In one general embodiment, a computer-implemented method includes receiving, by one or more processors, post-stack seismic data from a user; processing, by the one or more processors, the post-stack seismic data to identify non-conformities; retrieving, by the one or more processors, archived data that both matches contextual information associated with the post-stack seismic data and exhibits the non-conformities; creating, by the one or more processors, geo-located predictions to modify pre-stack processing to eliminate the non-conformities; and transmitting, by the one or more processors, the geo-located predictions to the user to modify pre-stack processing performed by the user.

In another general embodiment, a system includes a processor and logic integrated with the processor, executable by the processor, or integrated with and executable by the processor. The logic is configured to perform the foregoing computer-implemented method.

In another general embodiment, a computer program product for install-time software validation includes a computer-readable storage medium having program instructions embodied therewith. The program instructions are executable by a computer to cause the computer to perform the foregoing computer-implemented method.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
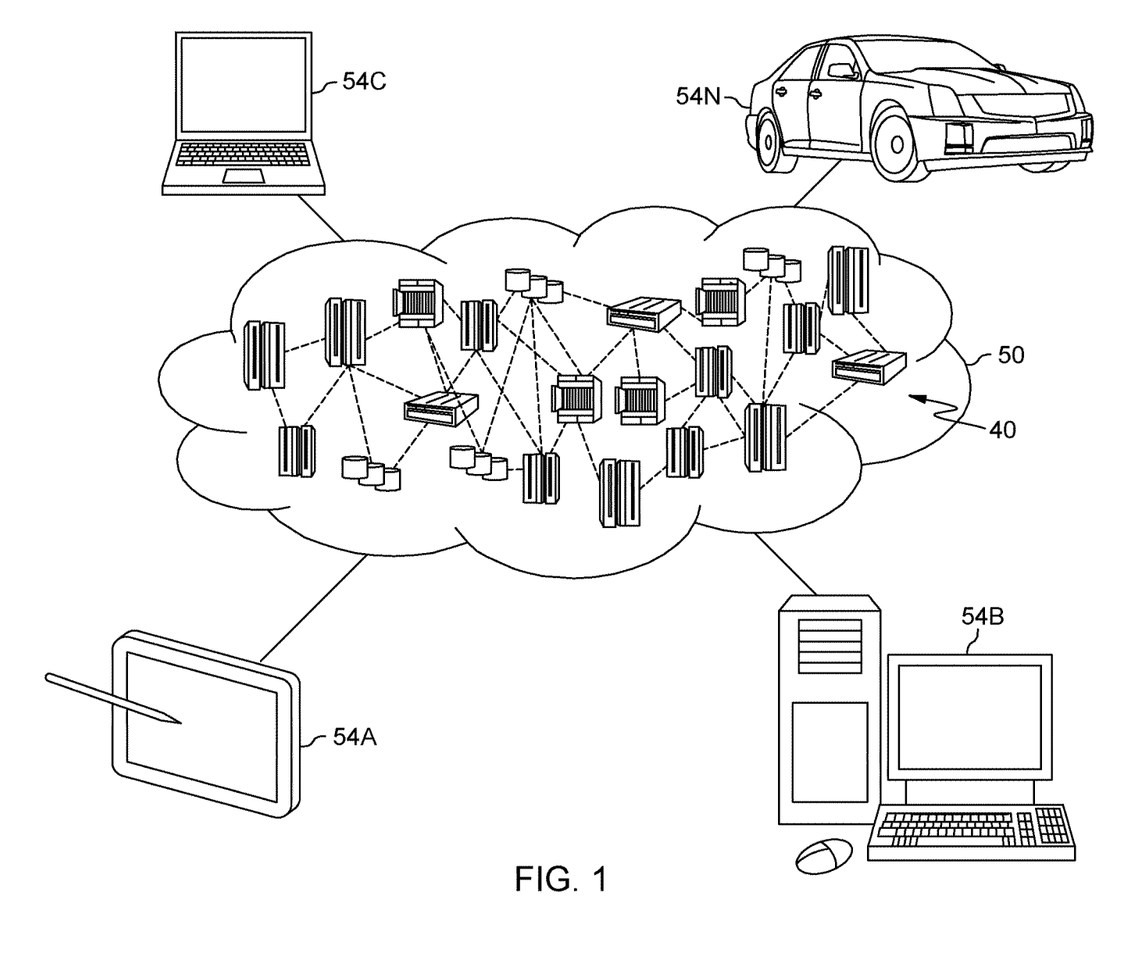
FIG. 1 depicts a cloud computing environment, according to embodiments of the present invention.

Referring now to FIG. 1, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 40 and cloud computing environment 50 can communicate with any type of computerized device over any type of network and/or network addressable connection (e.g., using a web browser).

Figure 2:
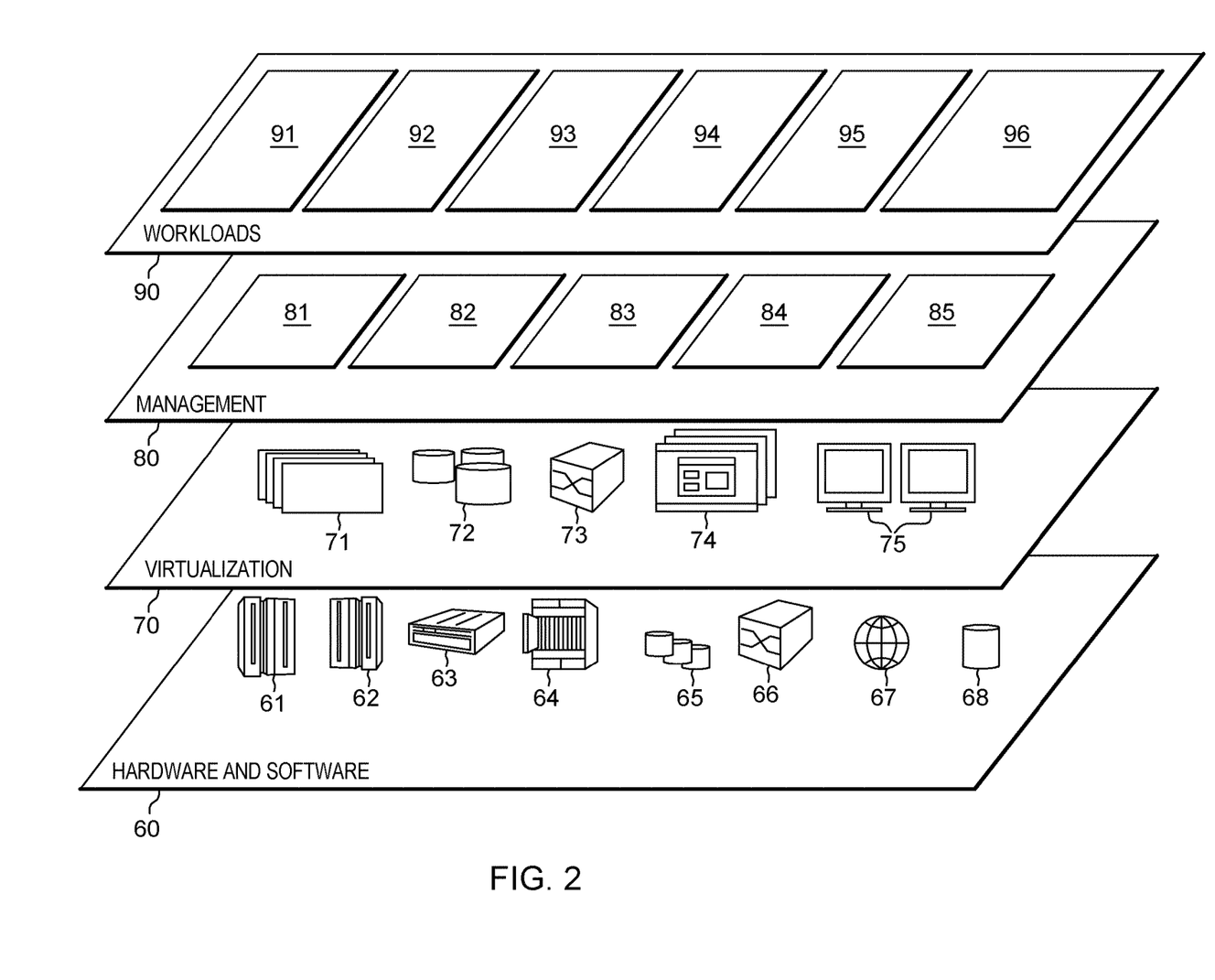
FIG. 2 depicts abstraction model layers, according to embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and model explanation optimization 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 3:
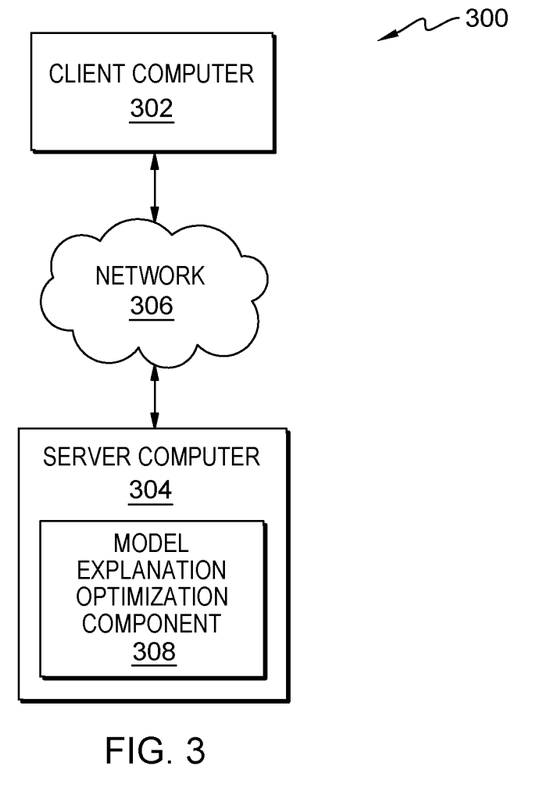
FIG. 3 is a high-level architecture, according to embodiments of the present invention.
Figure 4:
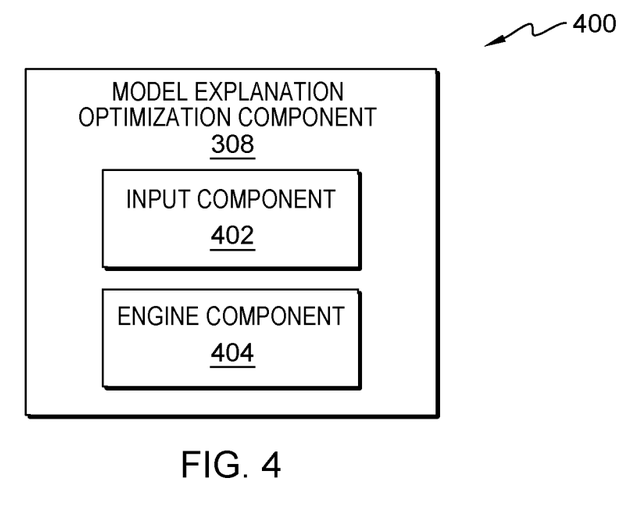
FIG. 4 is an exemplary detailed architecture, according to embodiments of the present invention.
Figure 5:
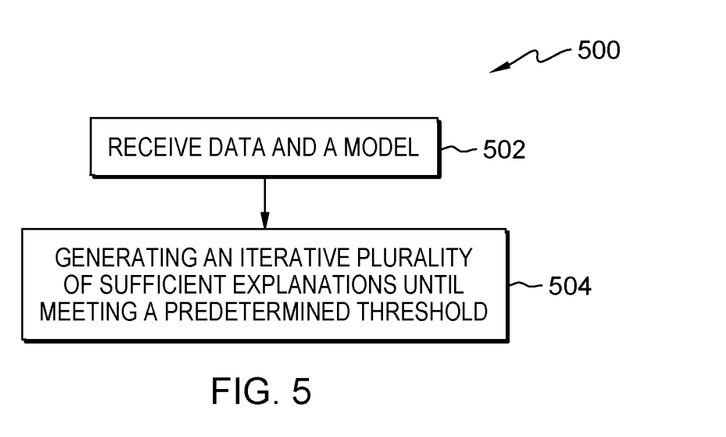
FIG. 5 is a flowchart of a method, according to embodiments of the present invention.

FIG. 3 is a high-level architecture for performing various operations of FIG. 5, in accordance with various embodiments. The architecture 300 may be implemented in accordance with the present invention in any of the environments depicted in FIGS. 1-4, among others, in various embodiments. Of course, more or less elements than those specifically described in FIG. 3 may be included in architecture 300, as would be understood by one of ordinary skill in the art upon reading the present descriptions.

Each of the steps of the method 500 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 includes a block diagram showing an exemplary processing system for a seismic imaging optimization environment to which the invention principles may be applied. The architecture 300 comprises a client computer 302, a model explanation optimization component 308 operational on a server computer 304 and a network 306 supporting communication between the client computer 302 and the server computer 304.

Client computer 302 can be any computing device on which software is installed for which an update is desired or required. Client computer 302 can be a standalone computing device, management server, a web server, a mobile computing device, or any other electronic device or computing system capable of receiving, sending, and processing data. In other embodiments, client computer 302 can represent a server computing system utilizing multiple computers as a server system. In another embodiment, client computer 302 can be a laptop computer, a tablet computer, a netbook computer, a personal computer, a desktop computer or any programmable electronic device capable of communicating with other computing devices (not shown) within user persona generation environment via network 306.

In another embodiment, client computer 302 represents a computing system utilizing clustered computers and components (e.g., database server computers, application server computers, etc.) that act as a single pool of seamless resources when accessed within install-time validation environment of architecture 300. Client computer 302 can include internal and external hardware components, as depicted and described in further detail with respect to FIG. 5.

Server computer 304 can be a standalone computing device, management server, a web server, a mobile computing device, or any other electronic device or computing system capable of receiving, sending, and processing data. In other embodiments, server computer 304 can represent a server computing system utilizing multiple computers as a server system. In another embodiment, server computer 304 can be a laptop computer, a tablet computer, a netbook computer, a personal computer, a desktop computer, or any programmable electronic device capable of communicating with other computing devices (not shown) within install-time validation environment of architecture 300 via network 306.

Network 306 can be, for example, a local area network (LAN), a wide area network (WAN) such as the Internet, or a combination of the two, and can include wired, wireless, or fiber optic connections. In general, network 306 can be any combination of connections and protocols that will support communications between client computer 302 and server computer 304.

Model explanation optimization component 308, operational on client computer 302, characterized as a path-sufficient explanations technique, can output a series of sufficient explanations for a given input of decreasing size (or value), from original input to a minimally sufficient explanation, which can trace the local boundary of a model in a smooth manner. Model explanation optimization component 308 can provide information about the local model behavior for the specific provided input. Model explanation optimization component 308 can provide this model explanation optimization for inputs comprising image data, tabular data and textual data.

FIG. 4 is an exemplary detailed architecture for performing various operations of FIG. 5, in accordance with various embodiments. The architecture 400 may be implemented in accordance with the present invention in any of the environments depicted in FIGS. 1-3 and 5, among others, in various embodiments. Of course, more or less elements than those specifically described in FIG. 4 may be included in architecture 400, as would be understood by one of skill in the art upon reading the present descriptions.

Each of the steps of the method 500 (described in further detail below) may be performed by any suitable component of the architecture 400. A processor, e.g., processing circuit(s), chip(s), and/or module(s) implemented in hardware and/or software, and preferably having at least one hardware component, may be utilized in any device to perform one or more steps of the method 500 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 can provide a detailed view of at least some of the modules of architecture 300. Architecture 400 can comprise a model explanation optimization component 308, which can further comprise an input component 402 and an engine component 404.

The input component 402 can receive data, labels and models, i.e., classifiers, for processing by the engine component 404 (described subsequently). The data can comprise image data, tabular data and textual data. The input component 402 can also manage and store intermediate data that is generated, condensed or filtered between iterations of minimization.

The engine component 404 can use the equation $$\min_{\delta} c \cdot f_k^{pp}(x_0, \delta) + \beta \|\delta\|_1 + \gamma \|\delta - AE(\delta)\|_2^2 \text{ subject to} \quad (1)$$

$$\exists N \in \mathbb{N} \text{ and } \delta_0, \ldots, \delta_N \text{ with}$$

$$\delta_0 = x_0, \delta_N = \delta \|\delta_i - \delta_{i-1}\|_2^2 \leq \epsilon \ \forall i = 1, \ldots, N$$

$$\delta_i \in X \cap \delta_{i-1} \ \forall i = 1, \ldots, N$$

$$\operatorname*{argmax}_j [Pred(\delta_i)]_j = \operatorname*{argmax}_j [Pred(x_0)]_j \forall i = 1, \ldots, N$$

to define a path sufficient explanation providing acceptable insight based on introducing constraints. Accordingly, even a sparse explanation can provide a smooth/gradual path of sufficient explanations. Regarding the constraints, $$\|\delta_i - \delta_{i-1}\|_2^2 \leq \epsilon$$

can ensure that successive explanations in the path are close to the previous explanation in the path, starting at the input. Further, the constraint $\delta_i \in X \cap \delta_{i-1}$ can ensure that successive explanations in the path can highlight a subset of the features highlighted in the previous explanations. Accordingly, further interpretability can be provided to the path as features not previously highlighted do not arise as important, which can lead to difficulties in understanding the resulting explanation.

The constraint $$\operatorname*{argmax}_j [Pred(\delta_i)]_j = \operatorname*{argmax}_j [Pred(x_0)]_j \forall i = 1, \ldots, N$$

can ensure that the same class is predicted as the input on each iteration. In total, these constraints can provide information of what it may take to remain in the particular class as important features are dropped or the importance of the features is reduced.

Engine component 404 can solve Equation 1 by iterating through alternating minimization and applying regularization to approximate a solution to the resulting constrained optimization. It should be noted that based on this solution technique, the constraint $$\|\delta_i - \delta_{i-1}\|_2^2 \le \epsilon$$

can be removed because it will automatically be enforced in the second and subsequent iterations. This technique produces a solvable Path-Sufficient Explanation Method (PSEM) equation $$\min_{\delta \in x \cap \delta_{i-1}^*} c \cdot f_k^{pp}(x_0, \delta) + \beta_i \|\delta\|_1 + \gamma \|\delta - AE(\delta)\|_2^2 + n\|\delta - \delta_{i-1}^*\|_2^2 \quad (2)$$

wherein embodiments can execute one iteration of alternating minimization to solve a regularized approximation of equation 2. It should be noted that this equation's application of constraints and use of the $l_2$ penalty to penalize the distance from $\delta_{i-1}^*$, i.e., embodiments described herein use $l_2$ to smooth the path rather than as a regularizer for smoothness of $\delta$, result in a significant improvement in quality of explanations in path.

Iterations of Equation 2 can be solved based on a gradient algorithm described in "Explanations based on the missing: Towards contrastive explanations with pertinent negatives" in *Advances in Neural Information Processing*, pages 592-603, 2018 by A. Dhurandhar, P. Y. Chen, R. Luss, C. C. Tu, P. Ting, K. Shanmugam and P. Das and a prox-algorithm described in "A fast iterative shrinkage-thresholding algorithm for linear inverse problems" in SIAM Journal on Imaging Sciences, 2(1):183-202, 2009 by A. Beck and M. Teboulle can, at the iterations, minimizes the term based on $\beta_i \|\delta\|1$ a first-order approximation minimizing of the remaining terms of Equation 2. It should be noted that the term "$\beta_i$" is indexed to increase sparsity through the iterations.

It should be noted that other algorithmic paths are presented by these embodiments. In one embodiment, the constraints $\delta_i \in X \cap \delta_{i-1}$ can be written as $\delta_i \le \delta_{i-1}$ where if $\delta_i$ is an n-vector, then n separable sets of N isotonic constraints can provide the entire path of sufficient explanations simultaneously, rather than sequentially. In another embodiment, after the first iteration of the algorithm, $\delta_i$ can be regularized to be close to both $\delta_{i+1}$ and $d_{i-1}$ to generate an even smoother path involving more iterations of alternating minimization.

In another embodiment, Equation 2 is extended to color images based on constraining an image by $\delta$ being in $M(\delta_{i-1}^*)$, which is the set of images resulting from all possible binary masks applied to the term $\delta_{i-1}^*$. In practice, the term $\delta_{i-1}^*$ is segmented and masks are constrained to cover superpixels, i.e., segments composed of multiple pixels. It should be noted that $M_\delta$ denotes the mask that when applied to input image $x_0$ produces image $\delta$, meaning the $l_2$ penalty described above keeps the new mask close to the mask learned at the previous iteration.

Accordingly, because optimization is performed over the binary masks, this penalty accomplishes the task of keeping images along the path close together. It should be noted that the embodiments create an initial mask by thresholding the learned mask, and if needed because the threshold mask approximates a solution to Equation 2, the embodiments add more superpixels until it is determined that an image is in the original class, providing denser but more informative pertinent positives.

FIG. 5 is an exemplary flowchart of a method 500 for minimally sufficient explanations for improving model understanding. At step 502, an embodiment, via input component 402, can receive data for processing. The data can be image data, tabular data or textual data. The embodiment can also receive a model for inputting and processing the data. At step 504, the embodiment, via engine component 404, can iteratively generate a plurality of sufficient explanations based on the data and the model until meeting a predetermined threshold.

Figure 6:
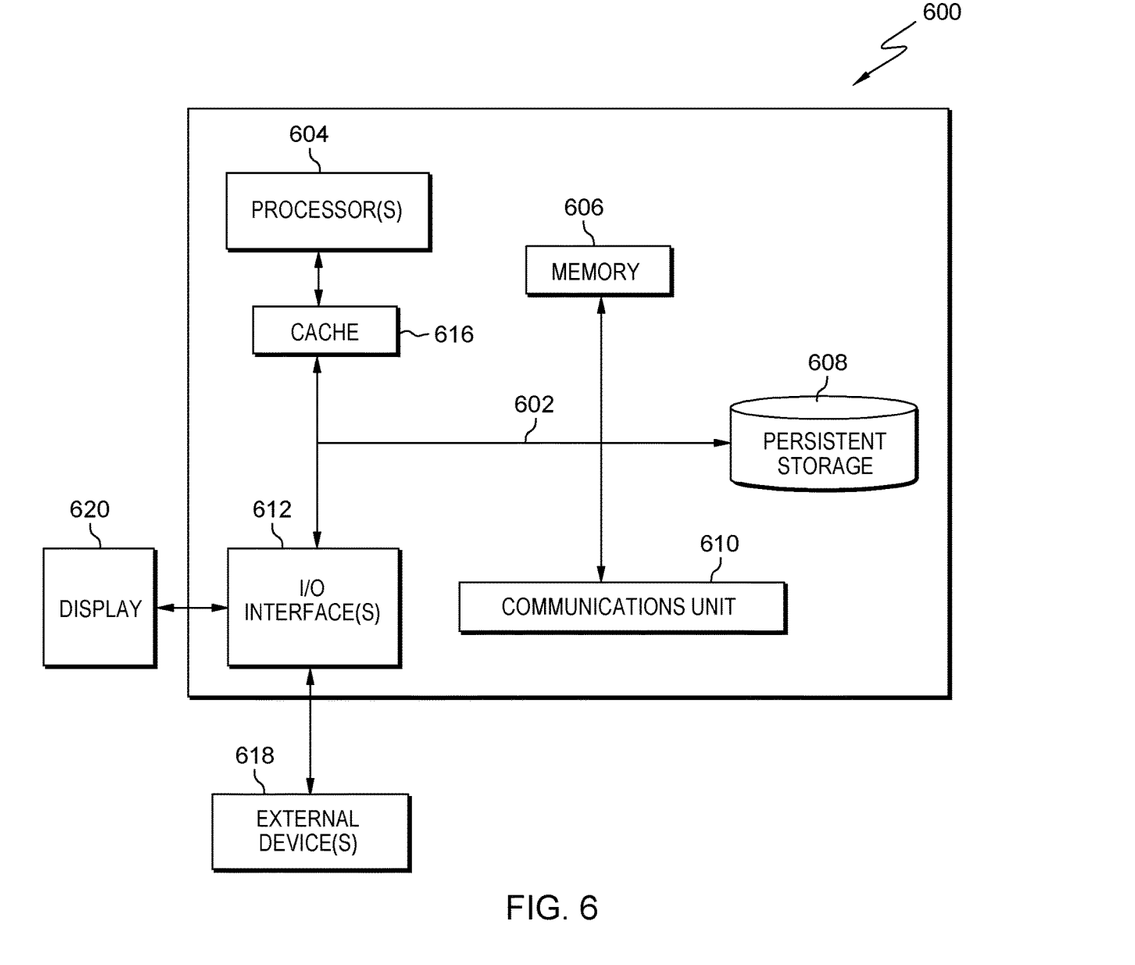
FIG. 6 is a block diagram of internal and external components of a data processing system in which embodiments described herein may be implemented, according to embodiments of the present invention.

FIG. 6 depicts computer system 600, an example computer system representative of client computer 302 and server computer 304. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Computer system 600 includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating minimally sufficient explanations for a differentiable model, the computer-implemented method comprising:
   receiving, by one or more processors, data and a model;
   generating, by the one or more processors, a series of sufficient explanations based on input of the data to the model,
   wherein successive input of the data is of decreasing size based on being constrained by a Path-Sufficient Explanations (PSE) algorithm until a minimally sufficient explanation is determined using a predetermined threshold, where the PSE algorithm constrains each successive explanation to a subset of features highlighted in a preceding explanation and to a same class as the preceding explanation to form a path of explanations, and a final explanation in the path of explanations determined by the predetermined threshold is the minimally sufficient explanation for the model.

2. The computer-implemented method of claim 1, wherein the data is at least one of image data, tabular data or textual data.

3. The computer-implemented method of claim 2, wherein the PSE algorithm is solved based on a regularized approximation.

4. The computer-implemented method of claim 1, wherein color image masks are 5. constrained by superpixels.

5. The computer-implemented method of claim 1, wherein the series of sufficient explanations is generated simultaneously based on isotonic constraints.

6. The computer-implemented method of claim 1, wherein a constraint term $\delta_i$ associated with the PSE algorithm is regularized to be within a predetermined threshold of the constraint terms $\delta_{i+1}$ and $\delta_{i-1}$.

7. A computer program product for generating minimally sufficient explanations for a differentiable model, the computer program product comprising:
   one or more non-transitory computer readable storage media and program instructions stored on the one or more non-transitory computer readable storage media, the program instructions comprising:
   program instructions to receive data and a model; and
   program instructions to generate a series of sufficient explanations based on input of the data to the model, wherein successive input of the data is of decreasing size based on being constrained by a Path-Sufficient Explanations (PSE) algorithm until a minimally sufficient explanation is determined using a predetermined threshold, where the PSE algorithm constrains each successive explanation to a subset of features highlighted in a preceding explanation and to a same class as the preceding explanation to form a path of explanations, and a final explanation in the path of explanations determined by the predetermined threshold is the minimally sufficient explanation for the model.

8. The computer program product of claim 7, wherein the data is at least one of image data, tabular data or textual data.

9. The computer program product of claim 8, wherein the PSE algorithm is solved based on a regularized approximation.

10. The computer program product of claim 7, wherein color image masks are constrained by superpixels.

11. The computer program product of claim 7, wherein the series of sufficient explanations is generated simultaneously based on isotonic constraints.

12. The computer program product of claim 7, wherein a constraint term $\delta_i$ associated with the PSE algorithm is regularized to be within a predetermined threshold of the constraint terms $\delta_{i+1}$ and $\delta_{i-1}$.

13. A computer system for generating minimally sufficient explanations for a differentiable model, the computer system comprising:
    one or more computer processors;
    one or more computer readable storage media; and
    program instructions stored on the one or more computer readable storage media for execution by at least one of the one or more processors, the program instructions comprising:
        program instructions to receive data and a model; and
        program instructions to generate a series of sufficient explanations based on input of the data to the model, wherein successive input of the data is of decreasing size based on being constrained by a Path-Sufficient Explanations (PSE) algorithm until a minimally sufficient explanation is determined using a predetermined threshold, where the PSE algorithm constrains each successive explanation to a subset of features highlighted in a preceding explanation and to a same class as the preceding explanation to form a path of explanations, and a final explanation in the path of explanations determined by the predetermined threshold is the minimally sufficient explanation for the model.

14. The computer system of claim 13, wherein the data is at least one of image data, tabular data or textual data.

15. The computer system of claim 14, wherein the PSE algorithm is solved based on a regularized approximation.

16. The computer system of claim 13, wherein color image masks are constrained by superpixels.

17. The computer system of claim 13, wherein the series of sufficient explanations is generated simultaneously based on isotonic constraints or a constraint term $\delta_i$ associated with the PSE algorithm is regularized to be within a predetermined threshold of the constraint terms $\delta_{i+1}$ and $\delta_{i-1}$.

\* \* \* \* \*